Patented Dec. 8, 1931

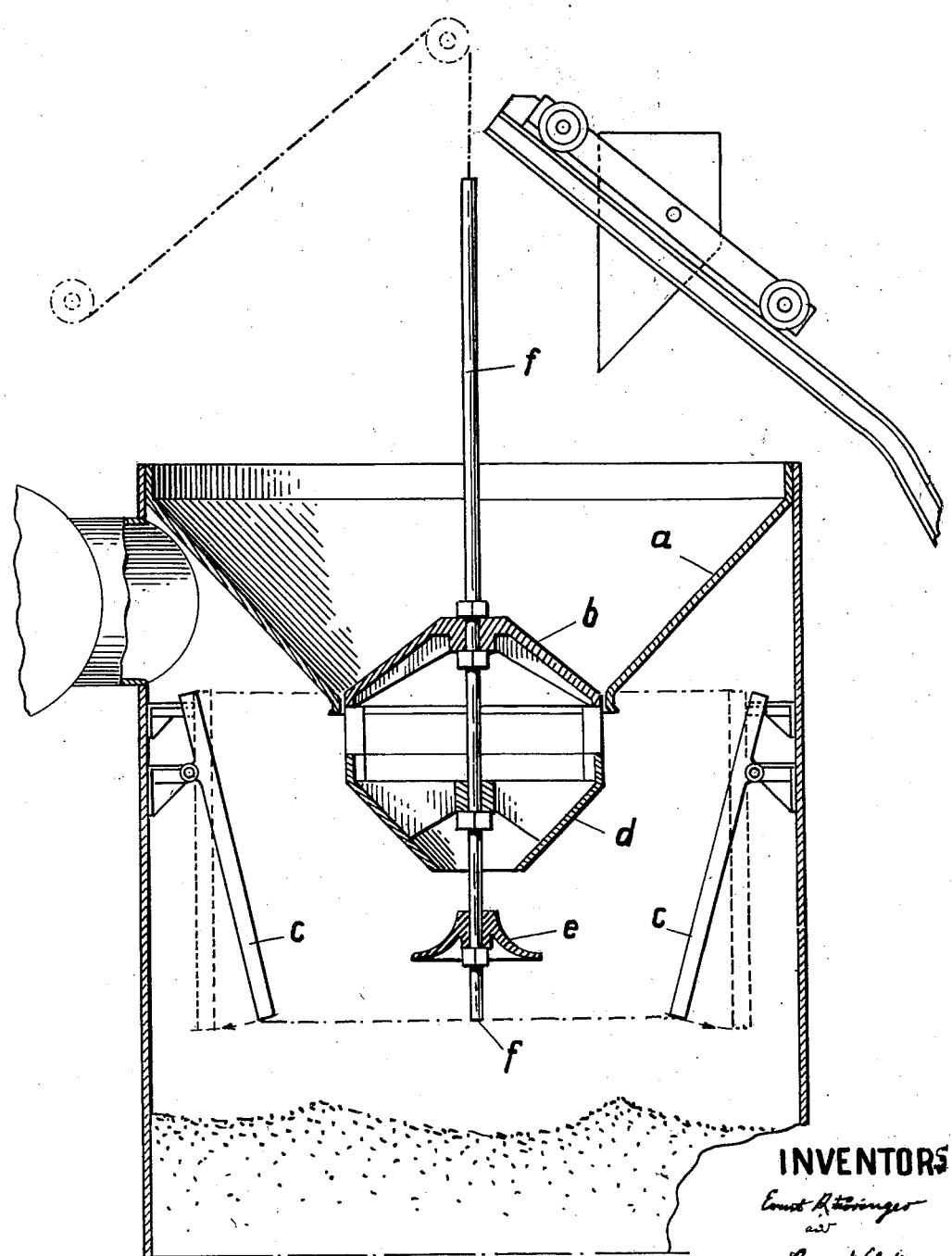

1,835,225

UNITED STATES PATENT OFFICE

ERNST KNÖRINGER AND CARL WOLSKI, OF WULFRATH, GERMANY

CHARGING DEVICE FOR SHAFT FURNACES

Application filed February 18, 1930, Serial No. 429,319, and in Germany January 5, 1929.

The charging devices for shaft furnaces with mixed firings hitherto known, by which the fine fuel to be distributed towards the rim of the furnace, and the coarse fuel and the liquid fuel, in leaving free the furnace rim, over the inner cross section of the shaft, utilize for this purpose a closing bell composed of two parts, by means of which the fuel is conveyed, by common lowering of both bell parts, towards the sieve grate situated on the furnace rim, to be separated into fine and coarse fuel, whereas by raising the upper part of the bell alone the fuel is distributed by a distributing body arranged coaxially under the bell.

This invention has for its object to simplify this construction in such a manner that the hitherto employed two-part closing bell is replaced by a one-part bell and that instead of the two conveying devices such as winches, levers or similar elements hitherto necessary for effecting the distribution of solid and liquid fuel only one such device is used. Moreover, the new arrangement presents a further important advantage in that the bell, even when the furnace service is hot going, can easily be removed as a whole, and replaced by a fresh one.

An embodiment of the invention is illustrated by way of example in section in the only figure of the accompanying drawing.

When the charging hopper $a$ has been filled with material the one-part closing bell $b$ is lowered from the closing position shown, with the funnel $d$ rigidly connected with it and with the distributing cone $e$. The fuel slides then over the closing bell $b$ which is of smaller diameter than the diameter of the outlet of the charging hopper $a$, towards the rim of the furnace where it encounters the sieve grate $c$ shown diagrammatically in the drawing which sieve grate separates the fuel into coarse and fine material. This sieve grate is preferably composed of a plurality of separate elements hingedly connected to the side of the furnace wall and the inclination of these elements is preferably adjustable for example by means of hand operated set-screws.

In order to charge the furnace with the fuel introduced into the charging hopper $a$ separately from the fuel in combustion, the closing bell $b$, together with the funnel $d$ and the distributing cone $e$, is raised from the closing position shown until the conical funnel $d$ forms a continuous funnel with the charging hopper $a$. The fuel then slips under the lifted closing bell $b$ from the charging hopper $a$ over the conical funnel $d$ onto the distributing cone $e$, which, owing to its shape, distributes the fuel uniformly over the inner cross section of the furnace leaving the rim clear. The distributing cone $e$ is arranged vertically slidable on the draw rod $f$ so that its spreading capability can be adapted to the actual working conditions and to the different kinds of fuel.

We claim:—

A charging device for shaft furnaces for distributing the fine fuel towards the rim of the furnace and the coarse fuel and also liquid fuel over the inner cross-section of the furnace leaving free the rim of the furnace, comprising in combination a charging hopper having a central discharge aperture, a one part closing bell in the aperture of said hopper adapted to be raised and lowered to control the feed of said hopper, a distributing device coaxially arranged under said closing bell adapted to distribute the fuel over the inner cross-section of the furnace, a sieve grate around said closing bell and under said hopper adapted to sift the fuel and supply the coarse fuel towards the middle cross-section and allow the fine fuel to pass to the rim of the furnace, an upwardly tapering portion of said bell adapted when said bell is lowered to supply the fuel to said sieve grate, and a lower funnel shaped portion of said bell distanced from said upper portion and having a central lower aperture above said distributor adapted when said bell is raised to be brought with its upper edge in alignment with the lower edge of said hopper and to supply the fuel through its central lower aperture to said distributing device.

In testimony whereof we affix our signatures.

ERNST KNÖRINGER.
CARL WOLSKI.